(12) United States Patent
Luka

(10) Patent No.: US 7,153,437 B2
(45) Date of Patent: Dec. 26, 2006

(54) CONTROLLING CORROSION IN PROCESS WATER SYSTEMS

(75) Inventor: Michael William Luka, Littleton, CO (US)

(73) Assignee: Johns Manville, Denver, CO (US)

( * ) Notice: Subject to any disclaimer, the term of this patent is extended or adjusted under 35 U.S.C. 154(b) by 347 days.

(21) Appl. No.: 10/877,651

(22) Filed: Jun. 25, 2004

(65) Prior Publication Data
US 2005/0284820 A1    Dec. 29, 2005

(51) Int. Cl.
*C02F 1/26* (2006.01)
(52) U.S. Cl. .................. 210/743; 210/749; 210/143; 210/198.1; 210/251; 442/391
(58) Field of Classification Search ............... 210/743, 210/749, 143, 198.1, 251; 442/391
See application file for complete search history.

(56) References Cited

U.S. PATENT DOCUMENTS 3,899,294 A * 8/1975 Magiros ............... 210/743
7,083,855 B1 * 8/2006 Lane et al. ............ 428/413

* cited by examiner

*Primary Examiner*—Robert A. Hopkins
(74) *Attorney, Agent, or Firm*—Robert D. Touslee; Timothy G. Hofmeyer

(57) ABSTRACT

A system for controlling the pH of the process water used in conjunction with formaldehyde-free binder composition for glass fiber products. A base solution is introduced into the process water used to coat the glass fibers in the formaldehyde-free binder after the water is extracted from binder coated glass fibers when the pH of the process water in less than about 6.0. The addition of the base solution increases the pH of the process water to a range from about 8.0 to about 6.0 thereby reducing the risk of corrosion when the process water is recirculated.

17 Claims, 1 Drawing Sheet

CONTROLLING CORROSION IN PROCESS WATER SYSTEMS

TECHNICAL FIELD

The invention relates to controlling the pH in the process water used to manufacture formaldehyde-free binder coated glass fiber products. Control of the pH of the process water during the water recycle phase reduces the potential for corrosion caused by the use of acids and other material in the process. pH control is accomplished by addition of neutralizing agents to adjust the pH of the process water to between about 6.0 and about 8.0 after the water has been extracted from the product.

BACKGROUND OF THE INVENTION

Fiberglass binders have a variety of uses ranging from stiffening applications where the binder is applied to woven or non-woven fiberglass sheet goods and cured, producing a stiffer product; thermo-forming applications wherein the binder resin is applied to sheet or lofty fibrous product following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize the majority to all of the water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins, e.g. urea/formaldehyde and resorcinol/formaldehyde resins, are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet characteristics so as to form a rigid thermoset polymeric mat for the glass fibers when cured. A low binder viscosity in the uncured state is required to allow the mat to be sized correctly. Also, viscous binders tend to be tacky or sticky and hence they lead to accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its specified vertical dimension when installed in a building.

From among the many thermosetting polymers, numerous candidates for suitable thermosetting fiber-glass binder resins exist. However, binder-coated fiberglass products are often of the commodity type, and thus cost becomes a driving factor, generally ruling out such resins as thermosetting polyurethanes, epoxies, and others. Due to their excellent cost/performance ratio, the resins of choice in the past have been phenol/formaldehyde resins. Phenol/formaldehyde resins can be economically produced, and can be extended with urea prior to use as a binder in many applications. Such urea-extended phenol/formaldehyde binders have been the mainstay of the fiberglass insulation industry for years.

Over the past several decades, however, minimization of volatile organic compound emissions (VOCs) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol/formaldehyde resole resins, changes in catalysts, and addition of different and multiple formaldehyde scavengers, has resulted in considerable improvement in emissions from phenol/formaldehyde binders as compared with the binders previously used. However, with increasing stringent Federal regulations, more and more attention has been paid to alternative binder systems which are free from formaldehyde.

One particularly useful formaldehyde-free binder system employs a binder comprising a polycarboxy polymer and a polyol. Formaldehyde-free resins are those which are not made with formaldehyde or formaldehyde-generating compounds. Formaldehyde-free resins do not emit appreciable levels of formaldehyde during the insulation manufacturing process and do not emit formaldehyde under normal service conditions. Use of this binder system in conjunction with a catalyst, such as an alkaline metal salt of a phosphorous-containing organic acid, results in glass fiber products that exhibit excellent recovery and rigidity properties.

These novel binder systems, however, at least employed at a pH of less than about 3.5, preferably less than 2.5, more preferably less than about 2.0. Variations in pH of as little as 0.3 can result in poor curing of the binder composition. This, in turn, results in glass fiber products which exhibit poor performance upon curing.

The low pH binder composition results in residual process water that is highly corrosive. This, in turn, affects the life of recycle systems used to return the process water to the make up portion of the process. It is desirable, therefore, to increase the pH of the process water to a point where the corrosive nature of the process water has been reduced thereby extending the life of the recycle system.

Published U.S. Applications 2003/022,458A1 and 2003/022,457A1 disclose wash water recycle systems for formaldehyde-free binders where the pH of the wash water is increased to 8.0 or greater. While this method purports to be effective in reducing corrosion, the resulting high pH wash water dictates an increased use of acid to make the binder composition when the wash water is used as the process water. In addition, significant amounts of base must be used to reduce the pH to the prescribed range.

It is therefore desirable to use a system whereby the corrosive nature of the process water is negated while keeping the pH of the process water essentially neutral.

It is also desirable to provide a feedback mechanism whereby the pH of the composition can be adjusted automatically to bring the measured pH within an acceptable range.

BRIEF SUMMARY OF THE INVENTION

The preparation of formaldehyde-free binder coated glass fiber products requires that the binder composition have a pH of less than about 3.5 to effectively coat the glass fibers and for proper curing. This is generally accomplished by the addition of acid during the process of making the binder composition. As a result, the process water and wash extracted during the coating step has a very low pH.

Due to the low pH, the process water is very corrosive and causes significant wear on the piping and storage equipment used to handle the recycled process water. This corrosion can be avoided by neutralizing the process water after it is extracted from the product such that the water has a pH of from about 6.0 to about 8.0. The water should also be treated to counteract any corrosion-causing agents present.

Raising the pH of the extracted process water essentially involves adding a base or other neutralizing composition to the process water after it is extracted from the glass fiber product. In a preferred embodiment, the pH of the process water after extraction is determined. If the pH of the process water is less than about 6.0, then a neutralizing agent is added to the process water to increase the pH to greater than about 6.0, preferably about 7.0 or more. Neutralizing agents useful in the practice of the invention include those who can increase the pH to about 7.0 still provide corrosion inhibition. Some of the neutralizing agents useful in the practice of the invention are lime, ammonia, and potassium hydroxide with lime preferred.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
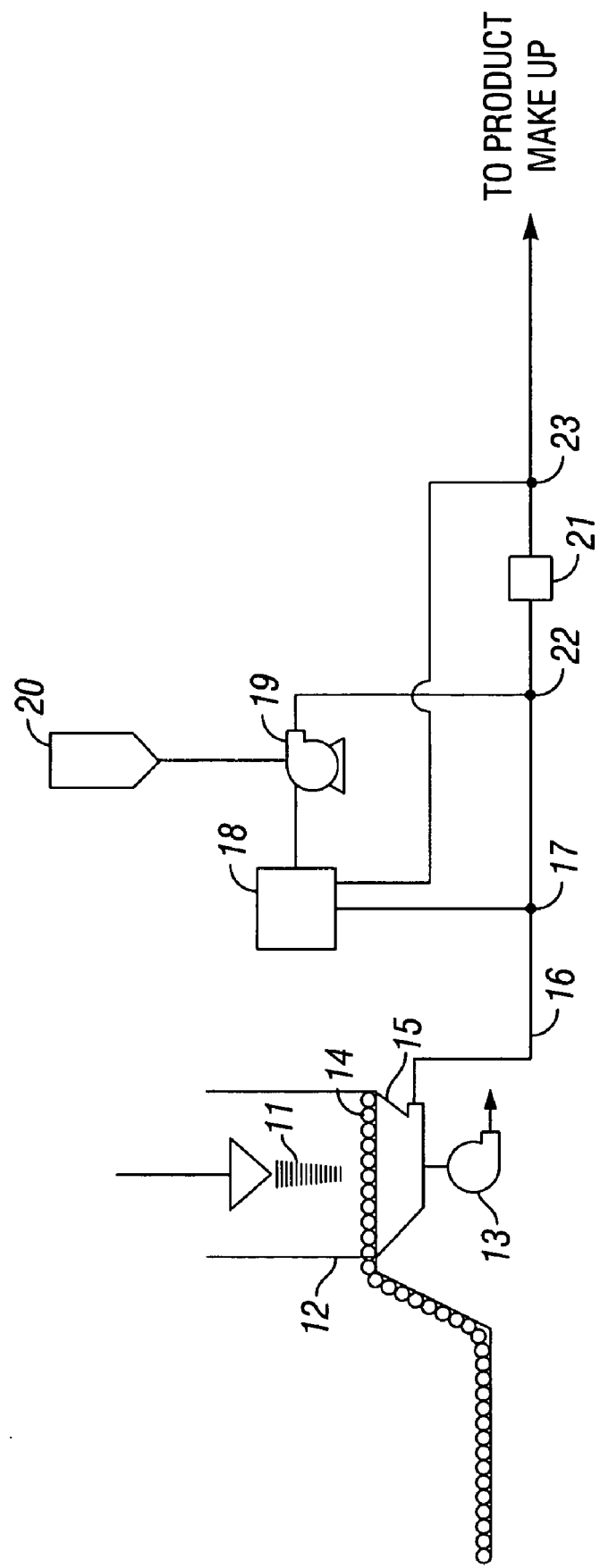
FIG. 1 is a schematic of the neutralization system of the present invention.

The invention relates to a method for preventing corrosion in the system used to recycle the process water used in the production of glass fiber product. The method is particularly useful for systems for the production of formaldehyde-free binders containing fiberglass products which require a low pH for product make up and curing.

During the production of these novel fiberglass products, significant amounts of process water are extracted from the product prior to drying. This process water has a relatively low pH owing to the nature of the binder resin and the acids used in the production of the products. In most cases, the extracted process water is reused in the process by reintroducing it into the process water container during the make up of the binder composition.

The low pH of the extracted process water, however, makes the water fairly corrosive which in turn places excessive wear on the piping and storage units used to recycle the extracted process water. The present invention provides a means for reducing the pH of the water and the corrosive reaction of the water to a point where the supply and storage facilities are relatively unaffected. The system involves monitoring the pH of the process water extracted from the fiberglass product and depending upon the pH measured, adding a balance of the neutralizing agent to the water to increase the pH to from about 2.0 to about 8.1.

The formaldehyde-free resins used to prepare the binders described above are typically poly-carboxy polymers such as acrylic resins although other formaldehyde-free resins may be used. As used herein, the term "formaldehyde-free means the resin or binder composition is substantially free of formaldehyde and/or does not liberate formaldehyde as a result of drying or curing. They generally have a molecular weight of less than about 10,000, preferably less than about 5,000, most preferably less than about 3,000 with about 2,000 being advantageous.

The polycarboxy polymer used in the binder of the present invention comprises an organic polymer or oligomer containing more than one pendant carboxy group. The polycarboxy polymer may be a homopolymer or copolymer prepared from unsaturated carboxylic acids including but not necessarily limited to, acrylic acid, methacrylic acid, crotonic acid, isocrotonic acid, maleic acid, cinnamic acid, 2-methylmaleic acid, itaconic acid, 2-methylitaeonic acid, .alpha.,.beta.-methyleneglutaric acid, and the like. Alternative, the polycarboxy polymer may be prepared from unsaturated anhydrides including, but not necessarily limited to, maleic anhydride, methacrylic anhydride, and the like, as well as mixtures thereof. Methods for polymerizing these acids and anhydrides are well-known in the chemical art.

The formaldehyde-free curable aqueous binder composition of the present invention also contains a polyol containing at least two hydroxyl groups. The polyol must be sufficiently nonvolatile such that it will substantially remain available for reaction with the polyacid in the composition during heating and curing operations. The polyol may be a compound with a molecular weight less than about 1000 and bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, .beta.-hydroxyalkylamides such as, for example, bis[N,N-di(β-hydroxyethyl)]adipamide, as may be prepared according to the teachings of U.S. Pat. No. 4,076, 917, hereby incorporated herein by reference, or it may be an addition polymer containing at least two hydroxyl groups such as, for example, polyvinyl alcohol, partially hydrolyzed polyvinyl acetate, and homopolymers or copolymers of hydroxyethyl(meth)acrylate, hydroxypropyl(meth) acrylate, and the like. The most preferred polyol for the purposes of the present invention is triethanolamine (TEA).

The ratio of the number of equivalents of carboxy, anhydride, or salts thereof of the polyacid to the number of equivalents of hydroxyl in the polyol is from about 1/0.01 to about ⅓. An excess of equivalents of carboxy, anhydride, or salts thereof of the polyacid to the equivalents of hydroxyl in the polyol is preferred. The more preferred ratio of the number of equivalents of carboxy, anhydride, or salts thereof in the polyacid to the number of equivalents of hydroxyl in the polyol is from about 1/0.4 to about 1/1. The most preferred ratio of the number of equivalents of carboxy, anhydride, or salts thereof in the polyacid to the number of equivalents of hydroxyl in the polyol is from about 1/0.6 to about 1/0.8, and most preferably from 1/0.65 to 1/0.75. A low ratio, approaching 0.7:1, has been found to be of particular advantage in the present invention, when combined with a low molecular weight polycarboxy polymer and the low pH binder.

The formaldehyde-free curable aqueous binder composition of the present invention also contains a catalyst. Most preferably, the catalyst is a phosphorous-containing accelerator which may be a compound with a molecular weight less than about 1000 such as, for example, an alkali metal polyphosphate, an alkali metal dihydrogen phosphate, a polyphosphoric acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polyacid and the polyol. Preferred is a level of phosphorous-containing accelerator of from about 2.5% to about 10%, by weight based on the combined weight of the polyacid and the polyol.

The binder reserves used in the invention are usually supplied as an aqueous suspension containing about 48 to 53% Wt. % solids. The binder composition used in the invention is prepared by first further diluting the binder to a point where the composition contains from about 7.5 to about 15 percent solids.

Acid is then added to the aqueous binder composition to reduce the pH to a less than about 3.5, preferably less than 3.0, much preferably less than 2.5. Low pH has been found to be important in ensuring proper application and curing of the binder composition.

Other additives, such as silane, silicon and processing and having also been added. This aqueous composition is then sprayed on the glass fibers shortly after the fibers are formed. As shown in FIG. 1, the resulting coated fibers 11 are gathered in a collection box 12. Air drawn through the collection box by one or more fans 13 which gather the glass fibers into a mat 14. The air flow also forces residual water out of the fiberglass mat 14 drying the collected fibers before they leave the collection box 12. The residual water is then collected in a dropout box 15. The water then enters the recycle system 16.

Water is also used to wash residual binder out of the glass fibers and off the walls of the equipment. Like the extracted process water described above, this water is also collected for reuse.

The process and wash waters exhibit a relatively low pH owing to the acids added to the binder composition and the nature of the binder composition itself. The low pH wash and process water is highly corrosive. Continued passage of the low pH process water through the recycle system leads to premature failure of the system. To prevent this from occurring, corrosion-inhibiting neutralizing agents are added to the process water after it exits the collection box.

The neutralizing agent should be one which can increase the pH of the process water to about 6.0 to 8.0 with a pH of about 7.0 preferred. The neutralizing agent should also be capable of inhibiting corrosion of the pipes while maintaining a pH in that region. Relatively weak bases have been found to be effective in increasing pH to about 7.0 while effectively inhibiting corrosion. Of these, lime, ammonia and potassium hydroxide have been shown to be effective with lime preferred.

The neutralizing agent can be added to the process water by any means including automatic, semiautomatic or manual systems. The neutralizing agent can be added in either liquid or powder form. In the preferred embodiment, the neutralizing agent is added automatically as a solution with addition of the solution regulated through a metering pump. In one embodiment, a 45% solution of lime is added to the water at a rate of about 4.5 gallons (17.0 liters) per hour. The rates used will depend on factors such as the size of the system involved, the starting pH and the likes.

One configuration of the neutralizing process is shown in FIG. 1. Process water is removed from the glass fiber product 14 in the collection box 12 entry into the process water recycle system 16. A pH in sensor 17 measures the pH of the process water and relays the measurement to a control system 18. The control system determines if the pH is less than a pre-set pH value, typically about 6.0 to about 8.0. If it is, then the control system 18 causes the addition of a neutralizing solution to the extracted process water. This is preferably done by activating a pump 19 which pumps a base solution from a storage container 20 into the process water recycle system 16. Optionally, a static mixer 21 is placed post downstream of the base solution addition point 22 to ensure thorough mixing of the base solution and the process water.

In another embodiment, a second pH meter 23 is installed to monitor the pH of the process water after the addition of the base solution. In this case, when the post addition pH is less than 6.0. The control unit 18 causes the rate of base solution addition to increase. If the pH is 8.0 or greater, the rate of base solution addition is decreased. In this manner, the post mixing pH is maintained within a range of from about 6.0 to about 8.0.

In yet another embodiment, the addition of neutralizing agent occurs before the initial pH measurement is taken. In this system, only the pH probe 23 downstream of the additive point 22 is used to monitor the pH. Again, if the measured pH deviates from the pre-set pH, the control unit causes a change in the amount or rate of addition of the neutralizing agent. pH meters useful in the practice of the invention include non-glass meters such as sold by Endress & Hauser. However, any pH meter or sensor capable of in-line pH measurements can be employed. The meters should be capable of measuring pH to about ±0.1 units.

The control unit can be any unit or system that allows for a comparison of the measured pH with a preset value. The control unit must be capable of analyzing that result and causing a change in the addition of neutralizing agent. In the preferred embodiment, the control unit is a PID unit which receives a continuous electrical signal from the pH probe, analyzes the data received and based on that analysis sends an electrical signal to the pH pump causing a change in the rate of addition.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for controlling the pH of the process water used to coat glass fibers with a formaldehyde-free binder composition comprising:
   extracting process water from formaldehyde-free binder coated glass fibers;
   directly measuring the pH of the process water after the extraction step;
   electrically relaying the pH measurement to a control unit;
   comparing the pH of the process water to a preset pH value using a control unit, said preset value ranging from about 6.0 to about 8.0;
   adding a neutralizing agent to said process water if the measured pH does not equal the preset pH.

2. The method of claim 1 wherein said preset pH is 7.0.

3. The method of claim 1 wherein said neutralizing agent is selected from the group consisting of lime, ammonia and potassium hydroxide.

4. The method of claim 1 wherein the formaldehyde-free resin is an acrylic resin.

5. The method of claim 1 wherein the neutralizing agent is added to the process water by means of a pump.

6. The method of claim 1 wherein the neutralizing agent is a solution of lime.

7. A method for controlling the pH of process water used to coat glass fibers with a formaldehyde-free binder composition comprising:
   extracting process water from formaldehyde-free binder coated glass fibers;
   directly measuring the pH of the extracted process water using a pH sensor;
   electrically relaying the pH measurement to a control unit;
   comparing the pH of the extracted process water to a pre-set pH value using a control unit;
   adding a neutralizing agent to said process water, said neutralizing agent selected from the group consisting of lime and potassium hydroxide.

8. The method of claim 7 wherein said pre-set pH value ranges from about 6.0 to about 8.0.

9. The method of claim 7 wherein said neutralizing agent is lime solution.

10. The method of claim 7 wherein said neutralizing agent is added by a pump.

11. The method of claim 7 wherein the neutralizing agent is lime.

12. The method of claim 7 wherein the comparison step is accomplished using a PID device.

13. A method for controlling the pH of process water used in the manufacture of formaldehyde-free binder coated fiberglass products comprising:
   removing process water from a collection box used to form a fiberglass product;
   adding a neutralizing agent to the process water;
   directly measuring the pH of the process water;
   electrically relaying the pH measurement to a control unit
   comparing the measured pH to a pre-set pH value using a control unit;
   adjusting the rate of addition of the neutralizing agent of the measured pH varies from the pre-set pH by more than a pre-set variation.

14. The method of claim 13 wherein the neutralizing agent is selected from the group consisting of lime, ammonia and potassium hydroxide.

15. The method of claim 13 where the pH is measured using a pH sensor.

16. The method of claim 13 wherein the pre-set pH ranges from about 6.0 to about 8.0.

17. The method of claim 13 wherein the neutralizing agent is added by means of a pump.

* * * * *